July 9, 1940. L. GADDONI 2,207,538
HYDRAULIC TRANSMISSION MECHANISM
Filed April 30, 1938
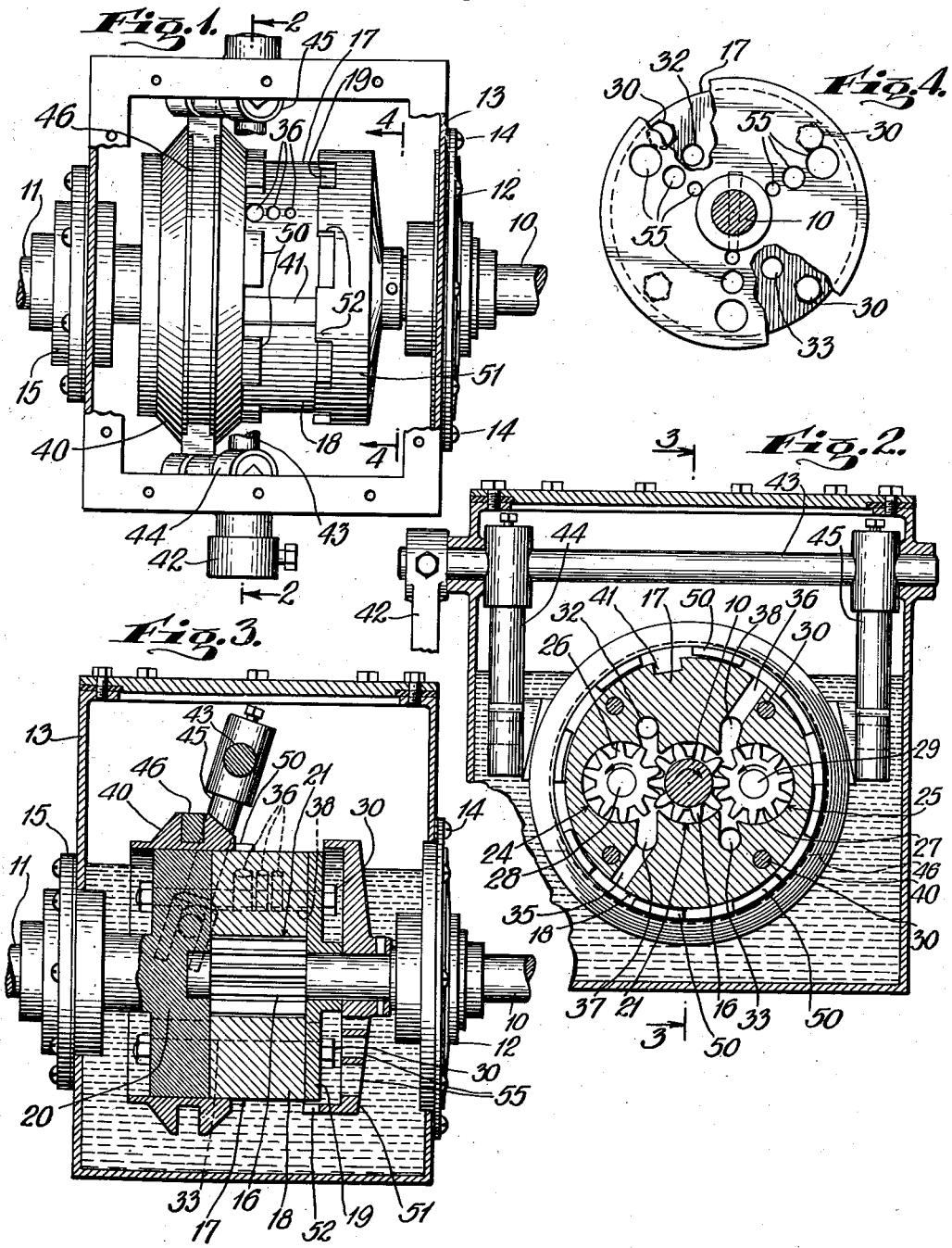
INVENTOR
LOUIS GADDONI
BY
ATTORNEY Patented July 9, 1940

2,207,538

UNITED STATES PATENT OFFICE 2,207,538

HYDRAULIC TRANSMISSION MECHANISM

Louis Gaddoni, New Rochelle, N. Y.

Application April 30, 1938, Serial No. 205,246

5 Claims. (Cl. 192—57)

This invention relates to hydraulic mechanisms for transmitting the rotational movement of a drive shaft to a driven shaft to produce variable speeds of the driven shaft.

One object of my invention is to provide a sturdy and simple hydraulic mechanism which will replace the present expensive and complicated mechanical clutch and gear transmission mounted between any gas or oil engine, steam turbine, Diesel or electric motor, or other power mechanism or drive shaft, and a driven or propeller shaft of a motor boat, automobile or any other moving vehicle or any other machine for which a device is necessary to gradually transfer the rotating movement of any power or drive shaft to a driven shaft to rotate and accelerate the latter from stationary position to any desired rotational speed and to the speed of the drive shaft for locked direct drive of the driven shaft.

Other objects of the invention consist in improved means whereby the amount of liquid supply used in the hydraulic clutch or transmission mechanism is not critical, improved means for insuring a continuous supply of liquid at the admission, intake or suction side of a liquid pump or liquid displacing mechanism, improved means for controlling, restricting and cutting off the amount of liquid delivered by the pump mechanism, and improved means for connecting the driven shaft to the driving shaft positively for direct drive after the driven shaft has attained a rotational speed substantially equal to that of the driving shaft.

Other objects of the invention will appear from the following description taken in connection with the drawing in which—

Fig. 1 is a top view of the transmission housing with the top cover removed and parts of the end walls of the housing cut away to expose my improved progressive hydraulic clutch mechanism;

Fig. 2 is a vertical transverse section taken on the line 2—2 of Fig. 1;

Fig. 3 is a vertical longitudinal section taken on the line 3—3 of Fig. 2; and

Fig. 4 is a vertical transverse section taken on the line 4—4 of Fig. 1.

For the purpose of disclosing my invention I have deemed it sufficient to illustrate my improved progressive hydraulic clutch mechanism without specific reference to any specific use to which it may be put other than as a driving connection between a driving shaft and a driven shaft. The mechanism disclosed may be substituted for the clutch and transmission mechanisms used in any powered vehicle or the like and a reversing mechanism of any character may be employed, if desired, such reversing mechanism preferably being associated with the driven shaft. I will refer to my invention as a hydraulic mechanism and the liquid as oil intending these terms to be regarded as generic.

I have shown a driving shaft 10 and a driven shaft 11, the driving shaft 10 being supported at its rear end in a bearing 12 of any suitable construction mounted in an opening in the front wall of the housing 13 which encloses my transmission mechanism and constitutes a reservoir for the oil supply for the transmission mechanism. Either shaft may be the drive shaft and the opposed ends of the shafts may be supported in bearings disassociated from the housing. The opening for the bearing in the front wall of the housing may be sufficiently large to permit of the transmission mechanism being inserted and removed from the housing 13 through this opening. The housing may be secured in stationary position, not disclosed, on the frame of the machine in which my transmission mechanism is employed. The bearing 12 may include a circular flange provided with apertures through which extend screw-bolts 14 threaded into the front wall of the housing to hold the bearing in place. A sealing washer may be placed between the flange and the outside face of the front wall of the housing to form an oil tight seal with the opening. The bearing member 12 may, if desired, house a roller bearing, not shown, for the shaft 10.

The front end of the driven shaft 11 is supported in the rear wall of the housing by a bearing 15 which may be of the same general construction as the bearing 12 and secured to the rear wall of the housing. The bearing 15 may also include a roller bearing, not shown.

Mounted on the end of the drive shaft 10 within the housing is a gear 16 preferably mounted in spaced relation to the end of the shaft 10, which has a bearing in a cylindrical casing generally designated by the numeral 17 which may be integral with or secured to the driven shaft 11 in any suitable manner. The casing 17 may comprise a central cylindrical member 18, a front end member or disk 19 and a rear end member 20, said rear member being provided with said bearing for the end of the drive shaft 10 and being shown as integral with the driven shaft 11. The central member 18 is provided with a cylindrical opening 21 in which said gear 16 rotates and the front member 19 is provided with an opening in which the driving shaft 10 rotates. The central member 18 is also provided with cylindrical openings 24 and 25 to receive liquid feeding rotary gears 26 and 27 meshing with the gear 16 and preferably mounted on studs 28 and 29 secured in the end member 20. The members comprising the casing 17 may be secured together by a plurality of bolts 30. The members 18 and 20 may be integral and the rotary gears may be supported in any suitable manner in the casing 17.

The amount of oil supply in the housing 13 is not critical and the level of the oil may be higher or lower than that indicated in the drawing. The members 18, 19 and 20 are provided with alined oil admission ports 32 and 33 which extend parallel to the common axis of the driving and driven shafts and in the case of the two gear construction are located at diametrically opposite sides of said axis as indicated. These ports communicate with the openings 21, 24 and 25 and furnish a supply of oil to the gears 16, 26 and 27. The cylindrical casing 17 is also provided with a plurality of radially extending discharge or delivery ports 35 and 36 which are preferably of graduated sizes as indicated in Fig. 1. These ports are located in the central member 18 and communicate with chambers 37 and 38 which extend through said central member and are in communication with the openings 21, 24 and 25 in which the gears 16, 24 and 25 rotate.

When the driving shaft 10 is rotated clockwise as indicated in Fig. 2, the gear 26 is rotated counter-clockwise and carries oil from the admission port 32 to the chamber 37 in communication with the delivery ports 35 forcing the oil out through these ports. Certain of the oil is also carried by the gear 16 to the chamber 38 which communicates with the delivery ports 36 forcing the oil out through these ports. The gear 27 rotates counter-clockwise carrying oil from the admission port 33 into the chamber 38 which communicates with the delivery ports 36. Certain of the oil in the admission port 33 is carried by the gear 16 on the driving shaft into the chamber 37 and forced out through the delivery ports 35.

It will be seen that, as the intake ports extend throughout the length of the cylindrical casing 17 and are parallel with the axis of the casing, centrifugal force acting on the oil due to the rotation of the casing 17 will not be sufficient to interfere with the suction of the oil and that there will be a continuous and sufficient supply of oil for the oil feeding gears 26 and 27.

When the driving shaft is rotated in the direction indicated in Fig. 2, oil will be drawn in through the admission ports 32 and 33 and delivered through the delivery ports 35 and 36. The delivery ports are of such size that they will not restrict the delivery of oil by the oil feeding gears so that no motion will be communicated from the shaft 10 to the shaft 11 while these ports are open.

For the purpose of causing the shaft 11 to be driven from the shaft 10 through this mechanism, I have provided a throttling sleeve 40 which is mounted on the casing 17 by means of a key 41 to cause it to rotate with the casing and to permit it to be shifted lengthwise of the casing. This sleeve may be operated by means of a lever 42, Fig. 2, removably mounted on a rod 43 supported in the side walls of the housing 13 and which is provided with removable arms 44 and 45 provided with bearing apertures to receive studs on a slip ring 46 seated in a groove in the sleeve 40. By means of this construction the sleeve 40 may be moved to the right and to the left, Fig. 3, on the casing 17. As the sleeve is moved to the right, Fig. 1, it will close the delivery ports 35 and 36 thereby restricting the amount of oil that the rotary feeding gears may deliver, which resistance to the delivery of oil causes the casing 17 to be rotated with the driving shaft 10 thereby causing the driving shaft 10 to drive the driven shaft 11. The speed at which the driven shaft 11 is driven depends upon the speed of the driving shaft and upon the position of the sleeve 40. I have found it preferable to employ a plurality of delivery ports 35 and a plurality of delivery ports 36 of graduated sizes as indicated, the construction being such that the larger ports are preferably closed by the first movement of the sleeve 40 and that the smallest ports are closed last.

For the purpose of providing a direct drive between the shafts 10 and 11, I have provided the sleeve 40 with teeth 50 and I have provided a disk-like member 51 which may be mounted on the drive shaft in any suitable manner and which is provided with teeth 52, the construction being such that when the smallest delivery ports have been closed, the driven shaft will have attained substantially the same speed as the drive shaft, so that the teeth 50 and 52 may be meshed by a further slight movement of the sleeve 40 to the right to provide a direct drive between the shafts 10 and 11.

As disclosed in Fig. 3, the disk 51 is preferably spaced from the end of the casing 17 and is provided with three series of holes 55 to supply oil to the admission ports 32 and 33 at that end of the casing.

While I have disclosed the ends of the driving and driven shaft as being mounted in bearings in the end walls of the transmission housing, it is, of course, obvious that these bearings may not be main bearings of the shaft and that I may employ oil sealing bearings or devices which seal against loss of oil around the shafts. The housing is preferably rigidly connected so as to be non-rotatable and preferably made of such a size that it may contain a large quantity of oil the level of which should always be at least as high as the admission ports 32 and 33 and if desired the housing may be filled with oil in order to provide a large supply of oil which will, of course, remain cooler than if a small supply of oil is used. If desired also the housing may be provided with radiating fins although this does not appear necessary unless the housing is made relatively small with respect to the transmission mechanism, and the driven shaft is driven over a long period at less speed than the driving shaft. By extending the admission ports in the direction of the axis of the shafts, centrifugal force acting on the oil in these ports due to the rotational movement of the cylindrical casing 17 will not affect the amount of oil supplied to the rotary feeding gears.

I prefer to extend the delivery ports in radial direction and to control the same by a sleeve keyed to the cylindrical casing 17 and to provide the same with teeth which are adapted to engage the teeth of a disk 51 secured to the driving shaft, shortly after the last of the series of delivery ports have been closed at which time the speed of the driven shaft will be substantially that of the driving shaft. By providing the disk 51 with a series of apertures the adjacent ends of the admission ports 32 and 33 will always have a sufficient supply of oil.

I prefer to mount the transmission mechanism spaced from the bottom wall of the housing so that dirt or abraded particles may settle on the bottom of the housing and not be forced through the gears as in certain other known constructions.

While I have disclosed a single embodiment of my invention, it is to be understood that I do not intend to be limited to the construction disclosed and that I intend to reserve the right to make any such changes as fall within the principles of the invention and the scope of the appended claims.

I claim:

1. A hydraulic transmission mechanism for communicating movement from a driving shaft to a driven shaft comprising a liquid pump including a cylindrical pump casing connected to one of said shafts, oil feeding gears supported in said casing, a driving gear also supported in said casing in mesh with said oil feeding gears and connected to said other shaft, said cylindrical casing being provided with admission through ports extending parallel with the casing axis and radially extending delivery ports, a throttling sleeve for controlling said delivery ports, surrounding said casing and keyed to said casing for rotation therewith and longitudinal sliding movement thereon, a direct drive member secured to said other shaft in spaced relation to one end of said cylindrical casing, cooperating interengageable driving means on the opposed faces of said sleeve and drive member, and means for moving said sleeve to throttle said delivery ports and to operatively connect said sleeve to said drive member upon the closing of said delivery ports.

2. A hydraulic transmission mechanism for communicating movement from a driving shaft to a driven shaft comprising a pump including a cylindrical casing connected to one of said shafts, oil feeding gears mounted on said casing, and a cooperating gear mounted on the other of said shafts, said casing being provided with admission ports and delivery ports, said admission ports extending parallel with the casing axis and through at least one end of the casing at points radially inward of an imaginary cylindrical surface generated about the axis of the casing and circumscribing and in contact with said oil feeding gears.

3. The combination with a driving shaft and a driven shaft, of a liquid pump including a cylindrical pump casing connected to said driven shaft, oil feeding gears supported in said casing, a driving gear also supported in said casing in mesh with said oil feeding gears and connected to said driving shaft, said cylindrical casing being provided with admission through ports extending parallel to the casing axis and radially extending delivery ports, a throttling sleeve for controlling said delivery ports surrounding said casing and keyed to said casing for rotation therewith and longitudinal sliding movement thereon, a direct drive member secured to said driving shaft in spaced relation to one end of said cylindrical casing, cooperating interengageable elements on the opposed faces of said sleeve and drive member, means for moving said sleeve to throttle said delivery ports and to operatively connect said sleeve to said driving member, and a liquid containing housing supporting the ends of said shafts and enclosing said liquid pump, said liquid pump being spaced from the walls of said housing.

4. In combination with driving and driven shafts, a hydraulic transmission mechanism including a cylindrical casing connected to one of said shafts and having radially extending ports, liquid displacing elements within said casing cooperating with the other of said shafts for forcing liquid through said ports, a sleeve surrounding said casing and slidably but non-rotatably connected thereto for regulating the flow of liquid through said ports, a disk secured to said other of said shafts adjacent to one end of said casing, and a cylindrical flange on said disk with the free edge of which said sleeve cooperates after said ports have been closed to provide a direct positive driving connection between said shafts.

5. In combination with driving and driven shafts, a hydraulic transmission mechanism including a cylindrical casing connected to one of said shafts and having radially extending delivery ports and admission ports extending parallel to the casing axis, liquid displacing elements within said casing cooperating with the other of said shafts for forcing liquid through said ports, a sleeve surrounding said casing and slidably but non-rotatably connected thereto for regulating the amount of liquid delivered by said displacing elements through said delivery ports, and a disk secured to said other of said shafts with which said sleeve cooperates after said ports have been closed to provide a direct driving connection between said shafts, said disk being perforated to admit oil into the space between said disk and casing.

LOUIS GADDONI.